Oct. 12, 1926.

1,602,934

C. J. QUILL

ALTERNATING CURRENT RECTIFIER

Original Filed May 2, 1922

INVENTOR
Charles J. Quill
By
Carlos P. Griffin
ATTORNEY.

Patented Oct. 12, 1926.

1,602,934

UNITED STATES PATENT OFFICE.

CHARLES J. QUILL, OF SAN FRANCISCO, CALIFORNIA, ASSIGNOR OF FORTY-NINE PER CENT TO LEON G. CHAIX, OF SAN FRANCISCO, CALIFORNIA.

ALTERNATING-CURRENT RECTIFIER.

Application filed May 2, 1922, Serial No. 557,822. Renewed March 6, 1926.

This invention relates to a mechanical rectifier for the production of unidirectional current from alternating current, a synchronous motor being used to operate the rectifying apparatus.

An object of the invention is to produce an apparatus with the fewest possible moving parts, which cannot be easily short circuited, and which will be reliable in action.

Another object of the invention is to provide means whereby the change from one conductor to another will be made when the current is practically at the zero of the sine wave thereby eliminating dangerous sparking.

It will be understood that this particular apparatus is run by a synchronous motor of 1800 R. P. M. for use with current of 3,600 cycles per minute, but the apparatus may be changed to suit any conditions as to rate of revolutions per minute and cycle of alternations.

Other objects of the invention will appear as the description proceeds.

An embodiment of the invention is shown in the accompanying drawings in which the same reference numeral is applied to the same portion throughout, but I am aware that there may be modifications thereof.

Figure 1:
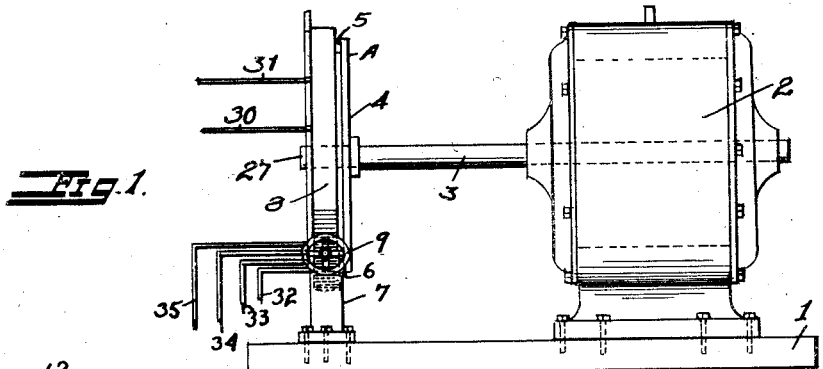
Fig. 1 is a side elevation of a synchronous motor showing the operating of this rectifying apparatus in conjunction therewith.
Figure 2:
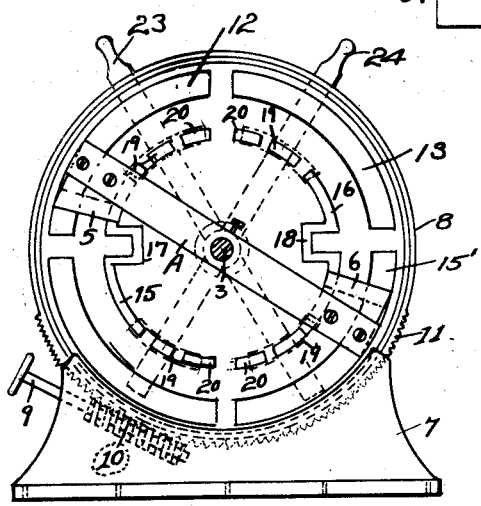
Fig. 2 is a side elevation of the rectifying apparatus looking from the right of Figure 1.

The numeral 1 indicates a base upon which the synchronous motor 2 is mounted, said motor having a shaft 3 which operates an arm 4 carrying two brushes 5 and 6 which extend across the inner and outer segments hereinafter mentioned. Adjacent the revoluble arm 4 is a base 7 in which a disc 8 is supported, and which disc may be moved circularly to adjust its position by means of the thumb screw 9 carrying a worm 10 in mesh with the teeth 11 on the outside of the disc 8. The disc 8 is made of any suitable non-conducting material, in the face of which are recessed four flat segments 12, 13, 14 and 15', each nearly 90 degrees in extent and placed symmetrically with respect to each other.

Within the outer segments are two segments 15 and 16, which have portions 17 and 18 shaped to pass out of contact with the brushes during the time the brushes are passing from one outer segment to another outer segment. At each end of the segments 17 and 18 there are two segments 19, 20, eight in all, which are for the purpose of increasing or diminishing the length of the live portion of the segments 15, 16 as may be required for a purpose presently to be explained, and the segments 19, 20 are provided each with contacts as indicated at 21, which pass through the disc 8 and touch shoes 22, there being four of the shoes 22, two on each lever 23, 24, and each of the segments 15, 16 is connected with said shoes by means of a contact member 25 also passing through the disc 8, there being four of the latter contacts. The ends of the segments 15 and 16 are bare on both faces of the disk 8, and the eight segments 19, 20 are bare on both faces of the disk. The object of this is to extend or diminish the effective length of the segments 15 and 16 by shifting the arms 23, 24 which carry the contacts 22.

The result of the foregoing construction is that by manipulating the levers 23, 24, the segments 19, 20, may be cut out of contact or into contact at will, whereby much or little of the sine wave of the alternating current may be delivered to the direct current apparatus as may be required.

Figure 3:
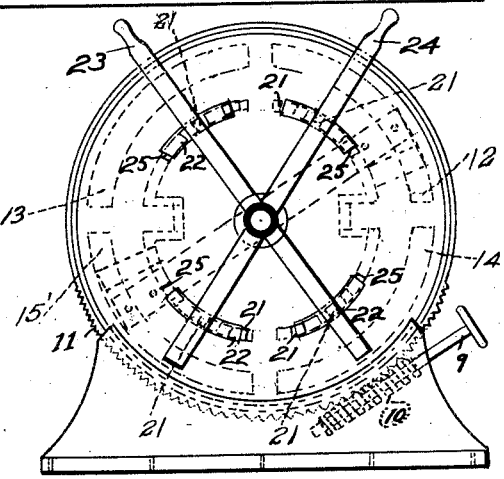
Fig. 3 is a side elevation of the rectifying apparatus looking from the left of Figure 1.

As shown in Figure 3, all of the segments 19, 20 are now in contact, and since the levers 23, 24 are made of suitable non-conducting material they will not short circuit the slides 22 one with another.

The levers 23, 24 are mounted upon a stub shaft 27 projecting from the disc 8.

Figure 4:
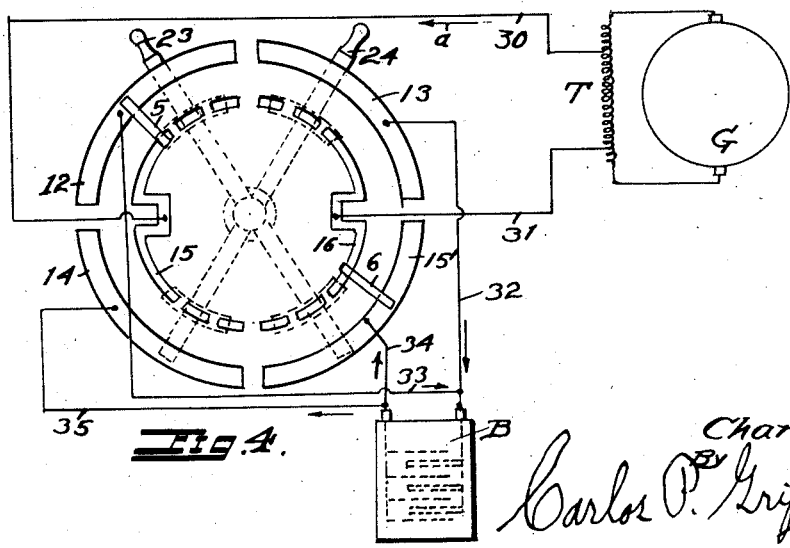
Fig. 4 is a side elevation of the rectifying apparatus showing a diagrammatic view of the wiring system used in conjunction therewith, the relative position of the motor brushes being indicated without their connections.

The wiring diagram is shown in Figure 4 and in which "G" indicates a generator, "T" a suitable transformer with lead wires 30, 31 extending to the segments 15, 16 respectively. "B" indicates a suitable direct current load, as for example, the storage battery which has a wire 32 extending to the segment 13, and a wire 33 connected to the segment 12. From the opposite pole of the battery, a wire 34 is connected with the segment 15', while a wire 35 is connected with the segment 14. Now, since the motor 2 operates in a well known manner in synchronism with the operation of the generator, the brushes 5 and 6 will be carried around also in synchronism with the generator, and it will be seen if the current alternations are observed that no matter what position the brushes 5 and 6 occupy they will always deliver unidirectional current to the battery circuit.

The operation of the apparatus is as follows: Assuming an alternation to be taking place in the direction of the arrow "a" Figure 4, current will pass to the segment 15. Since the brush 5 now connects segments 12 and 15, current will flow to the battery along the wire 33 and then along wire 34 to the segment 15', brush 6, segment 16 and then back to the transformer "T" by way of the wire 31. Now, assuming the brushes to turn clockwise 90 degrees, it will be seen that an opposite alternation of the current is taking place, and at this time current will pass to the segment 16, thence via brush 5 to segment 13 and to the battery over the wire 32.

From the battery the direct current will then pass to the wire 35 and segment 14, brush 6, segment 15 and wire 30 back to the transformer, when either of the brushes connect the segment 14 with the segment 15.

What I claim is as follows, but various modifications may be made in the construction shown in the drawings and above particularly described form, within the purview of my invention.

I claim:

1. A current rectifier comprising a set of four stationary flat metal segments, a set of two other segments adjacent the first segments and overlapping them symmetrically in pairs, two brushes 180 degrees apart contacting with the two sets of segments, a synchronous motor adapted to rotate the brushes, an alternating current supply, a circuit connecting said current supply with the second named set of segments, and a direct current load circuit connected to the other four segments in pairs.

2. A current rectifier comprising a set of four stationary flat metal segments, a direct current load circuit connected with said segments in pairs, a set of two other segments adjacent the first mentioned segments and overlapping them symmetrically in pairs, an alternating current supply circuit connected with the latter segments, two brushes 180 degrees apart contacting with said sets of segments, a synchronous motor adapted to rotate the brushes over the segments, and means to shift the position of the segments angularly to regulate the position of the several segments to correspond with the change in phase of the alternating current.

3. A current rectifier comprising a set of four stationary metal segments arranged symmetrically around a circle with their faces substantially in a single surface, a direct current load connected with said segments in pairs, a set of two other segments arranged symmetrically with respect to the first segments with their faces in substantially the same surface, brushes bearing on the several segments, and a synchronous motor adapted to rotate the brushes in contact with both sets of segments.

4. A current rectifier comprising a set of four stationary flat metal segments arranged symmetrically around a circle in a plane, a direct current load connected with said segments in pairs, a set of two other segments arranged symmetrically with respect to the first segments and with their contact faces in substantially the same plane, an alternating current supply circuit connected with the latter two segments, a synchronous motor, brushes operated thereby to rotate in contact with said two sets of segments, and means to shift the segments angularly to correct the position of said segments to correspond with changes in phase of current supply thereto.

5. A current rectifier comprising a set of four stationary flat metal segments, a direct current load connected with said segments in pairs, a set of two other segments overlapping the first segments symmetrically in pairs, short segments at the ends of the latter segments, means to move said segments into or out of contact with the fixed segments at will, two brushes 180 degrees apart, adapted to connect the two sets of segments, and a synchronous motor adapted to rotate the brushes in contact with the segments.

6. A current rectifier comprising a set of four stationary flat metal segments arranged symmetrically around a circle, a direct current load connected with said segments in pairs, a set of two other segments arranged symmetrically with respect to each other adjacent the first segments and overlapping them in pairs, an alternating current supply circuit connected with said two segments, two brushes 180 degrees apart connecting the two sets of segments and adapted to be rotated thereover, a synchronous motor adapted to rotate the brushes over the segments.

In testimony whereof I have hereunto set my hand this 18th day of April A. D. 1922.

CHARLES J. QUILL.